(12) United States Patent
Akamine

(10) Patent No.: US 11,593,598 B2
(45) Date of Patent: Feb. 28, 2023

(54) NON-TRANSITORY COMPUTER READABLE MEDIUM AND INFORMATION PROCESSING APPARATUS FOR GENERATING AND STORING PLURAL PDL FILES FOR ONE PORTION OF DATA

(71) Applicant: FUJIFILM BUSINESS INNOVATION CORP., Tokyo (JP)

(72) Inventor: Ryo Akamine, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 416 days.

(21) Appl. No.: 16/569,932

(22) Filed: Sep. 13, 2019

(65) Prior Publication Data

US 2020/0097782 A1 Mar. 26, 2020

(30) Foreign Application Priority Data

Sep. 25, 2018 (JP) .............................. JP2018-179444

(51) Int. Cl.
*G06K 15/02* (2006.01)
*G06F 3/12* (2006.01)

(52) U.S. Cl.
CPC ....... *G06K 15/1814* (2013.01); *G06F 3/1206* (2013.01); *G06F 3/1248* (2013.01); *G06K 15/1813* (2013.01); *G06K 2215/0011* (2013.01)

(58) Field of Classification Search
CPC .......... G06K 15/1814; G06K 15/1813; G06K 2215/0011; G06F 3/1206; G06F 3/1248; G06F 3/1211; G06F 3/1212; G06F 3/1292; H04N 2201/0075
USPC ..................................... 358/1.13, 1.15, 1.16
See application file for complete search history.

(56) References Cited

U.S. PATENT DOCUMENTS

| 2011/0286036 | A1* | 11/2011 | Kobayashi | G06F 3/1248 358/1.15 |
| 2013/0229679 | A1* | 9/2013 | Kamath | G06F 3/1285 358/1.15 |
| 2014/0022573 | A1* | 1/2014 | Schleede | G06F 3/1288 358/1.13 |

FOREIGN PATENT DOCUMENTS

| JP | 2007-310770 A | 11/2007 |
| JP | 2018-49435 A | 3/2018 |

* cited by examiner

*Primary Examiner* — Kent Yip
(74) *Attorney, Agent, or Firm* — Oliff PLC

(57) ABSTRACT

A non-transitory computer readable medium stores a program causing a computer to execute a process including: generating plural page description language (PDL) files written in plural types of PDLs for one portion of data; and performing control such that the generated plural PDL files and a different portion of the data other than the one portion are stored in an internal or external storage device in association with each other.

20 Claims, 9 Drawing Sheets

NON-TRANSITORY COMPUTER READABLE MEDIUM AND INFORMATION PROCESSING APPARATUS FOR GENERATING AND STORING PLURAL PDL FILES FOR ONE PORTION OF DATA

CROSS-REFERENCE TO RELATED APPLICATIONS

This application is based on and claims priority under 35 USC 119 from Japanese Patent Application No. 2018-179444 filed Sep. 25, 2018.

BACKGROUND

(i) Technical Field

The present disclosure relates to a non-transitory computer readable medium and an information processing apparatus.

(ii) Related Art

There is known an information processing apparatus that converts image data to be printed into print data of all of a plurality of data types preset before a printing device that executes a print process is selected upon receiving a print instruction for the image data, acquires information on data types printable by a printing device from the printing device when the printing device is selected to execute the print process by a user, selects print data printable by the printing device which is selected to execute the print process from among the plurality of data types of converted print data on the basis of the acquired information on the printable data types, and transmits the selected print data to the printing device through a near-field wireless communication section or the like (see Japanese Unexamined Patent Application Publication No. 2018-49435).

SUMMARY

When printing data, it is necessary to generate a page description language (PDL) file for the data. The type of the PDL file may differ depending on the printing device which prints the data. Thus, if the PDL file is generated after the printing device to print the data is selected, it takes time to start printing of the data. In the case where a plurality of types of PDL files are generated for the entire data before the printing device to print the data is selected, a PDL file of a type supported by the printing device is selected when the printing device is selected, and the selected PDL file is transmitted to the printing device, in contrast, the plurality of types of PDL files for the entire data squeezes the storage region while reducing the time before the start of printing of the data.

Aspects of non-limiting embodiments of the present disclosure relate to reducing the time before an unspecified printing device starts printing while saving a storage region compared to a case where a plurality of types of PDL files are generated for the entire data.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a non-transitory computer readable medium storing a program causing a computer to execute a process including: generating a plurality of page description language (PDL) files written in a plurality of types of PDLs for one portion of data; and performing control such that the plurality of generated PDL files and a different portion of the data other than the one portion are stored in an internal or external storage device in association with each other.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described in detail below with reference to the accompanying drawings.

[Overview of Present Exemplary Embodiment]

In the present exemplary embodiment, a plurality of page description language (PDL) files written in a plurality of types PDLs are generated for one portion of data, and control is performed such that the plurality of PDL files and a different portion of the data other than the one portion are stored in an internal or external storage device in association with each other. The one portion of the data may be a portion of the data that is the first to be printed. For example, if the data are document data containing a plurality of pages, the one portion may be a portion of the document data including a first page. If the data are image data containing a plurality of images to be printed sequentially in the chronological order of the date and time of creation, the one portion may be image data for several images selected sequentially in the chronological order of the date and time of creation. In the following description, document data containing a plurality of pages are taken as an example of the data, a first page of the document data is taken as an example of the one portion of the data, and second and subsequent pages of the document data are taken as an example of the different portion. An aspect in which control is performed so as to store the data in an internal storage device is described as a first exemplary embodiment, and an aspect in which control is performed so as to store the data in an external storage device is described as a second exemplary embodiment.

[First Exemplary Embodiment]
(Overall Configuration of Image Processing System)

Figure 1:
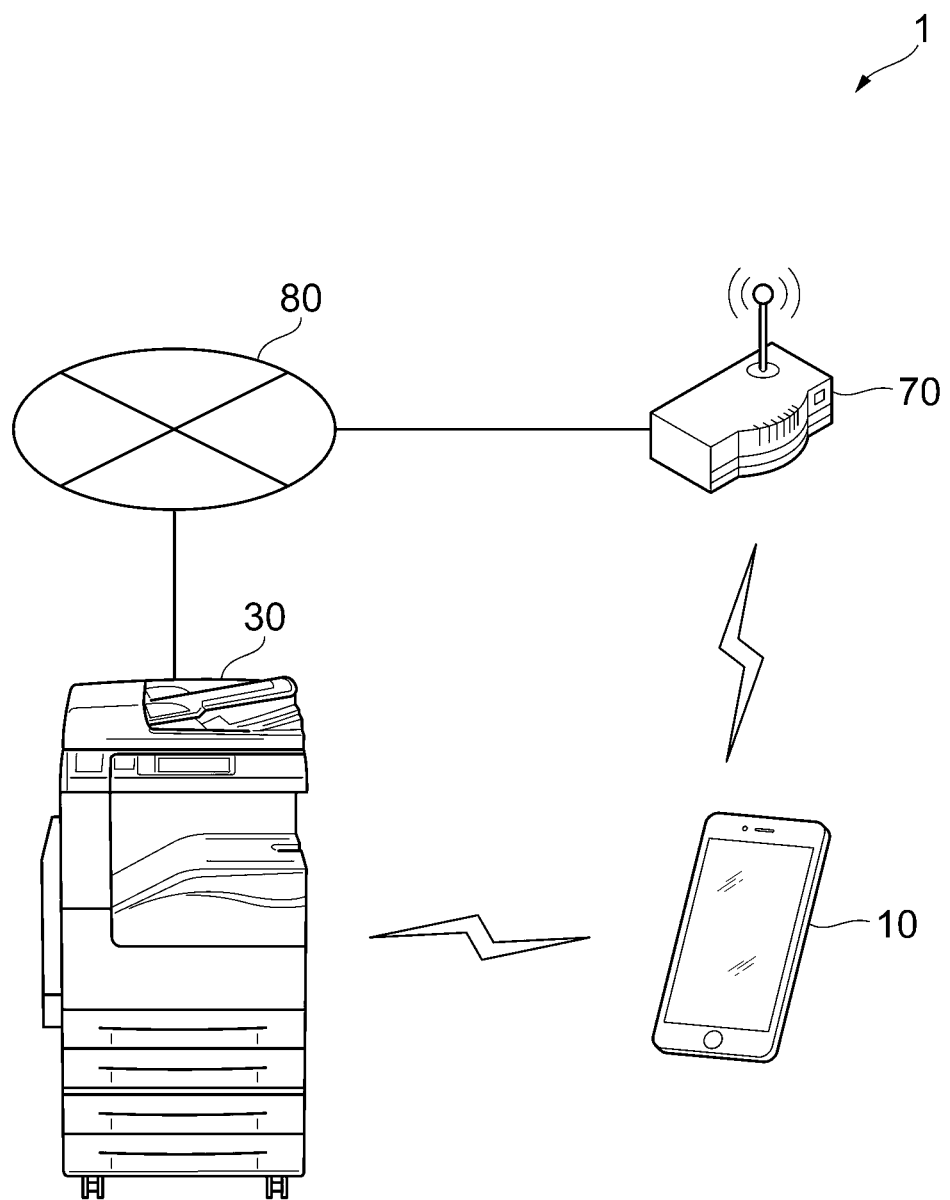
FIG. 1 illustrates an example of the overall configuration of an image processing system according to a first exemplary embodiment of the present disclosure.

FIG. 1 illustrates an example of the overall configuration of an image processing system 1 according to a first exemplary embodiment. As illustrated in the drawing, the image processing system 1 includes a portable terminal 10 and an image processing apparatus 30. The portable terminal 10 is wirelessly connectable to a communication line 80 via an access point 70 through wireless communication such as Wi-Fi (registered trademark), and is also wirelessly connectable to the image processing apparatus 30 through near-field wireless communication such as NFC (Near Field Communication) or BLE (Bluetooth Low Energy) (registered trademark). The image processing apparatus 30 is connected to the communication line 80. While there is only one each of portable terminal 10 and image processing apparatus 30 in the drawing, there may be a plurality of portable terminals 10 and image processing apparatuses 30. The communication line 80 may be the Internet, for example.

The portable terminal 10 is a computer device that is used by a user of the image processing apparatus 30. The portable terminal 10 holds document data to be printed, and instructs the image processing apparatus 30 to print the document data. The portable terminal 10 is preferably implemented by a smartphone, for example. In the present exemplary embodiment, the portable terminal 10 is provided as an example of a computer and an information processing apparatus.

The image processing apparatus 30 is a device that performs image processing such as forming an image on a recording medium such as paper, reading an image from a recording medium such as paper, transmitting an image to a public line, and receiving an image from a public line. It should be noted, however, that the image processing apparatus 30 may perform at least one of such image processing operations. For example, the image processing apparatus 30 is a printer from the viewpoint of forming an image only, a scanner from the viewpoint of reading an image only, a copier from the viewpoint of reading an image and forming an image, and a facsimile from the viewpoint of reading an image, transmitting an image, receiving an image, and forming an image. In the present exemplary embodiment, the image processing apparatus 30 is provided as an example of a printing device.

(Hardware Configuration of Portable Terminal)

Figure 2:
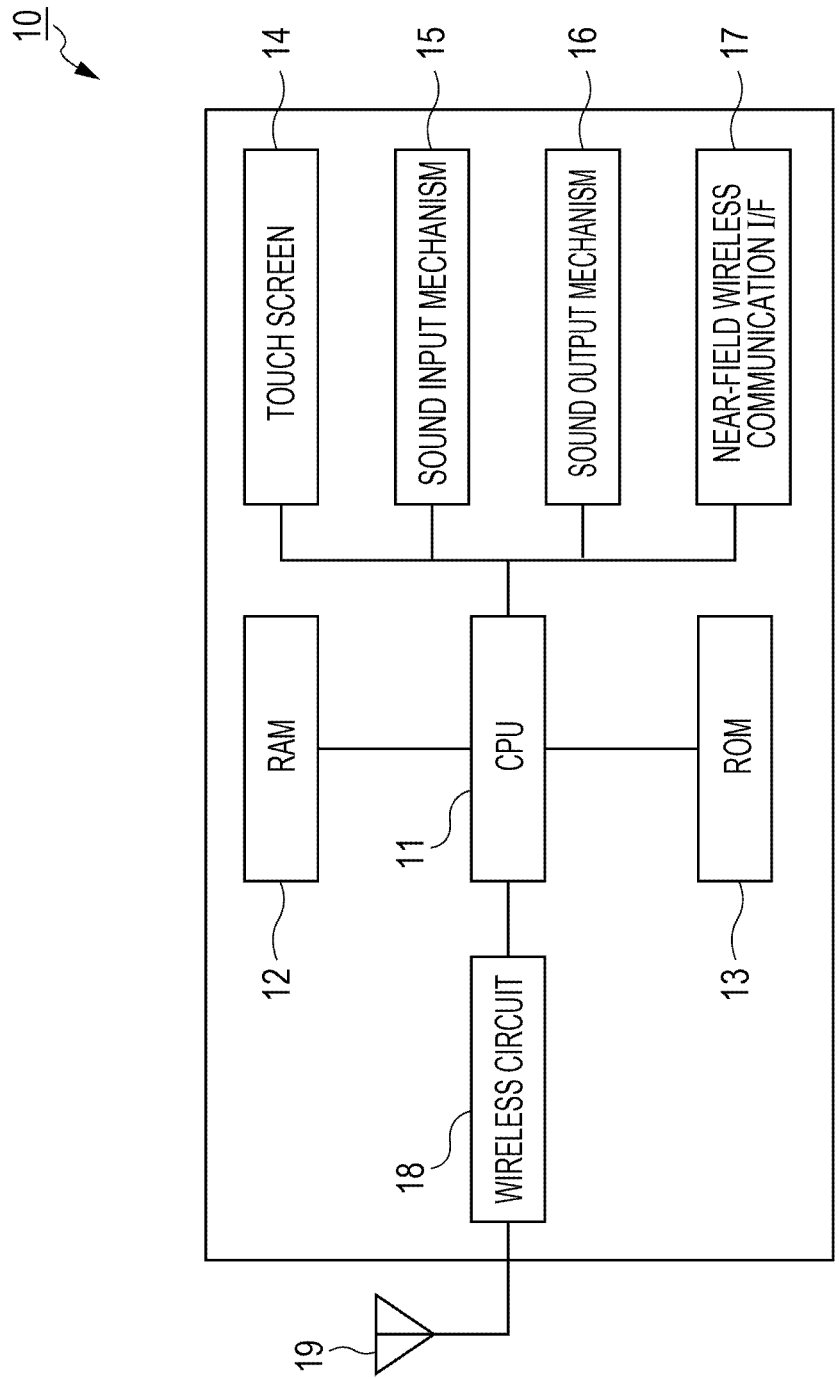
FIG. 2 illustrates an example of the hardware configuration of a portable terminal according to the first and second exemplary embodiments of the present disclosure.

FIG. 2 illustrates an example of the hardware configuration of the portable terminal 10 according to the first exemplary embodiment. As illustrated in the drawing, the portable terminal 10 includes a central processing unit (CPU) 11 that serves as a computation unit, a random access memory (RAM) 12 and a read only memory (ROM) 13 that each serve as a storage unit, a touch screen 14 that displays various information and receives an operation input from the user, a sound input mechanism 15 such as a microphone, a sound output mechanism 16 such as a speaker, and a near-field wireless communication interface (I/F) 17 that transmits and receives various information to and from the image processing apparatus 30 through near-field wireless communication such as NFC or BLE. The portable terminal 10 also includes a wireless circuit 18 and an antenna 19 that perform wireless communication via a base station. The wireless circuit 18 includes a baseband large-scale integrated (LSI) chip that performs signal processing on digital data transmitted and received wirelessly, although not illustrated.

(Hardware Configuration of Image Processing Apparatus)

Figure 3:
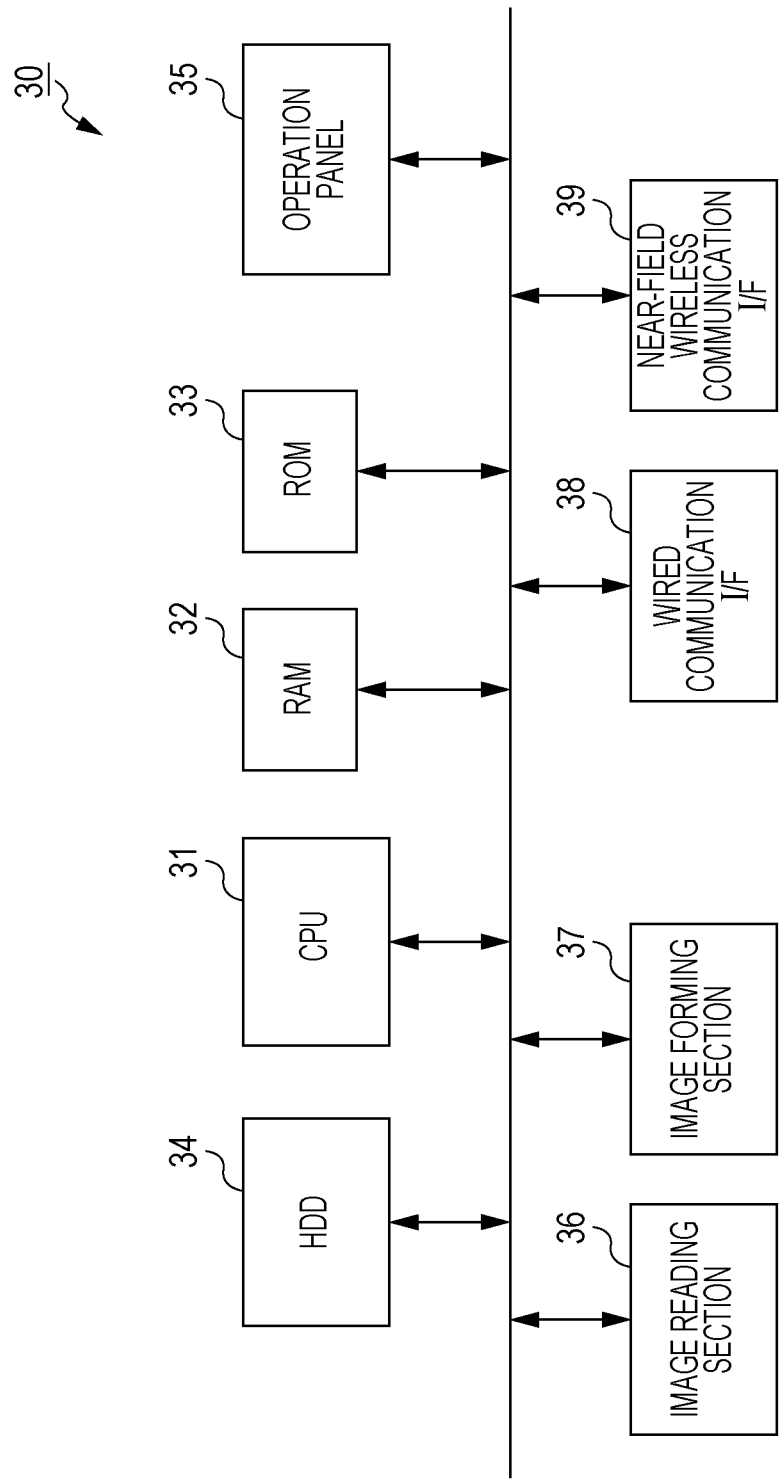
FIG. 3 illustrates an example of the hardware configuration of an image processing apparatus according to the first and second exemplary embodiments of the present disclosure.

FIG. 3 illustrates an example of the hardware configuration of the image processing apparatus 30 according to the first exemplary embodiment. As illustrated in the drawing, the image processing apparatus 30 includes a CPU 31, a RAM 32, a ROM 33, a hard disk drive (HDD) 34, an operation panel 35, an image reading section 36, an image forming section 37, a wired communication interface (hereinafter referred to as a "wired communication I/F") 38, and a near-field wireless communication interface (hereinafter referred to as a "near-field wireless communication I/F") 39.

The CPU 31 loads various types of programs stored in the ROM 33 etc. into the RAM 32 to execute the programs to implement various functions to be discussed later.

The RAM 32 is a memory that is used as a working memory for the CPU 31, for example. The ROM 33 is a memory that stores the various types of programs etc. to be executed by the CPU 31. The HDD 34 is a magnetic disk device, for example, that stores image data read by the image reading section 36, image data for use in image formation performed by the image forming section 37, etc.

The operation panel 35 is a touch screen, for example, that displays various information and that receives an operation input from the user. The operation panel 35 is composed of a display that displays the various information and a position detection sheet that detects a position indicated by an indication unit such as a finger or a stylus pen. Alternatively, a display and a keyboard may be used in place of the touch screen.

The image reading section 36 reads an image recorded on a recording medium such as paper. The image reading section 36 may be a scanner, for example, and may be of a CCD type in which light radiated from a light source and reflected by an original copy is contracted using a lens to be received by charge coupled devices (CCD), or a CIS type in which light sequentially radiated from a light emitting diode (LED) light source and reflected by an original copy is received by a contact image sensor (CIS).

The image forming section 37 forms an image on a recording medium such as paper. The image forming section 37 may be a printer, for example, and may be of an electrophotographic system in which toner adhering to a photosensitive body is transferred onto a recording medium to form an image, or an inkjet type in which ink is injected onto a recording medium to form an image.

The wired communication I/F 38 transmits and receives various information to and from other devices, such as the portable terminal 10, via the communication line 80. The near-field wireless communication I/F 39 transmits and receives various information to and from the portable terminal 10 through near-field wireless communication such as NFC or BLE.

(Functional Configuration of Portable Terminal)

Figure 4:
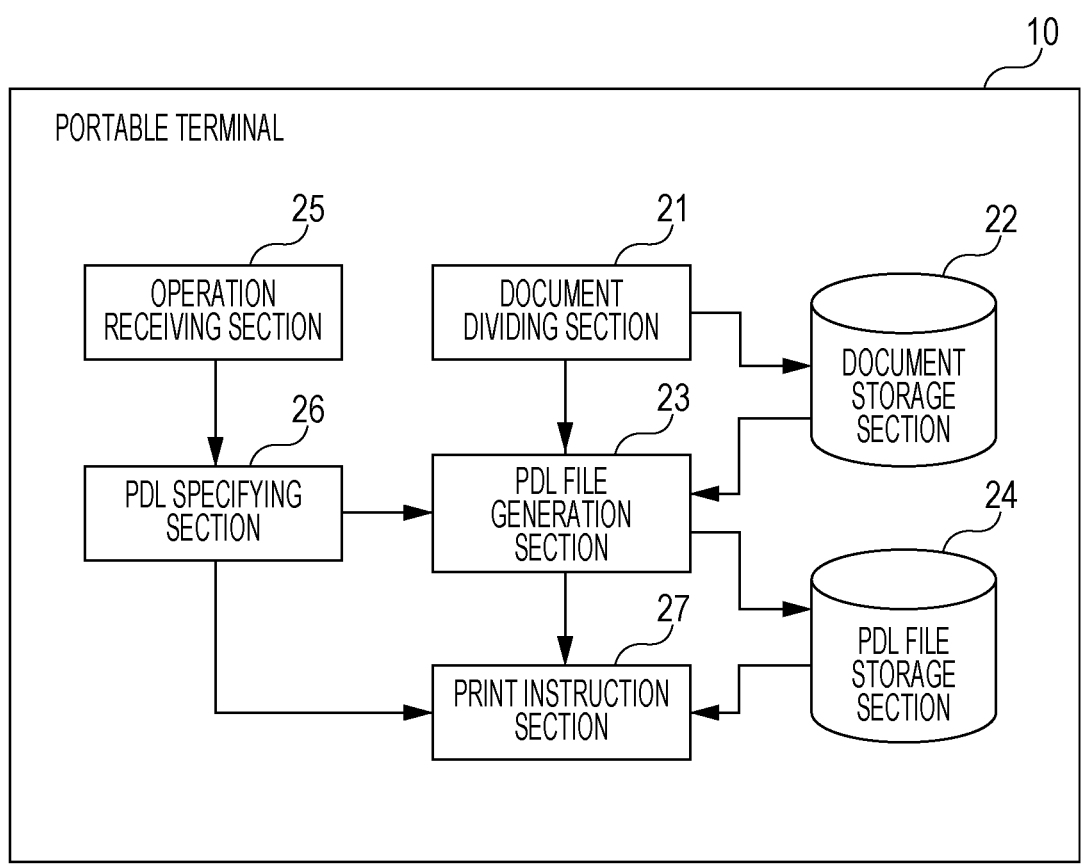
FIG. 4 is a block diagram illustrating an example of the functional configuration of the portable terminal which constitutes the image processing system according to the first exemplary embodiment of the present disclosure.

FIG. 4 is a block diagram illustrating an example of the functional configuration of the portable terminal 10 which constitutes the image processing system 1 according to the first exemplary embodiment. As illustrated in the drawing, the portable terminal 10 according to the first exemplary embodiment includes a document dividing section 21, a document storage section 22, a PDL file generation section 23, a PDL file storage section 24, an operation receiving section 25, a PDL specifying section 26, and a print instruction section 27.

The document dividing section 21 divides document data (hereinafter referred to simply as a "document") to be printed into a first page and second and subsequent pages.

The document storage section 22 is an example of an internal storage device, and stores the second and subsequent pages of the document which are obtained by the dividing by the document dividing section 21. In that event, the document storage section 22 stores the second and subsequent pages of the document in association with a universally unique identifier (UUID). The UUID may be the path name and the file name of the document, for example. Alternatively, the document storage section 22 may further store the first page of the document, which is obtained by the dividing by the document dividing section 21, in association with the second and subsequent pages and the UUID. In addition, the document storage section 22 provides the second and subsequent pages of the document, which are stored therein, to the PDL file generation section 23 when the PDL file generation section 23 generates a PDL file from the second and subsequent pages of the document which are obtained by the dividing by the document dividing section 21.

The PDL file generation section 23 generates one or a plurality of PDL files written in one or a plurality of PDLs from a given document. Examples of the PDLs include PostScript (registered trademark) and PCL (registered trademark). Specifically, in a print preparation process, the PDL file generation section 23 generates a plurality of PDL files written in a plurality of types of PDLs. That is, the PDL file generation section 23 generates a plurality of PDL files from the first page of the document which is obtained by the dividing by the document dividing section 21. The plurality of types of PDLs may be all of the types of PDLs supported by an app that implements the present exemplary embodiment on the portable terminal 10. In the present exemplary embodiment, the PDL file generation section 23 is provided as an example of a generation unit that generates a plurality of PDL files written in a plurality of types of PDLs for one portion of data, and the function of the PDL file generation section 23 is used as an example of a first generation function to generate a plurality of PDL files written in a plurality of types of PDLs for one portion of data. In addition, in a print instruction process, the PDL file generation section 23 generates a PDL file (hereinafter referred to as a "corresponding PDL file") written in a PDL (hereinafter referred to as a "corresponding PDL") corresponding to the image processing apparatus 30 as the output destination. That is, the PDL file generation section 23 generates a corresponding PDL file for the second and subsequent pages from the second and subsequent pages of the document which are obtained by the dividing by the document dividing section 21. In the present exemplary embodiment, the corresponding PDL is used as an example of a PDL of a specific type supported by the printing device, the corresponding PDL file for the second and subsequent pages is used as an example of a second PDL file written in a PDL of a specific type for a different portion of the data, and the function of the PDL file generation section 23 is used as an example of a second generation function to generate a second PDL file.

The PDL file storage section 24 is an example of an internal storage device, and stores a plurality of PDL files generated from the first page of the document by the PDL file generation section 23. In that event, the PDL file storage section 24 stores the plurality of PDL files in association with a UUID. The UUID may be the path name and the file name of the document as the source of the PDL files, for example. In addition, the PDL file storage section 24 provides the PDL files which are stored therein to the print instruction section 27 when the print instruction section 27 takes out a corresponding PDL file from among the plurality of PDL files which are generated by the PDL file generation section 23.

The document storage section 22 stores the second and subsequent pages of the document. The PDL file storage section 24 stores a plurality of PDL files generated from the first page of the document. Such pages and PDL files are associated with each other with a common UUID. In that sense, the document storage section 22 and the PDL file storage section 24 are an example of a control unit that performs control such that the plurality of PDL files and a different portion of the data other than the one portion are stored in an internal storage device in association with each other, and the function of the document storage section 22 and the PDL file storage section 24 is an example of a control function to perform control such that the plurality of PDL files and a different portion of the data other than the one portion are stored in an internal storage device in association with each other.

The operation receiving section 25 receives an operation performed on the touch screen 14 of the portable terminal 10. In particular, the operation receiving section 25 receives an operation to tap a print button that is used to request the image processing apparatus 30 to print the document to be printed. In the present exemplary embodiment, the function of the operation receiving section 25 is used as an example of a receiving function to receive a print request to request a printing device to print the data.

The PDL specifying section 26 specifies a corresponding PDL, which is a PDL supported by the image processing apparatus 30 as the output destination, via the wireless circuit 18 in the case where the operation receiving section 25 receives an operation to tap the print button.

The print instruction section 27 instructs the image processing apparatus 30 to print the document to be printed by transmitting a corresponding PDL file to the image processing apparatus 30 via the wireless circuit 18 when the PDL specifying section 26 specifies a corresponding PDL. Specifically, first, the print instruction section 27 takes out a corresponding PDL file for the first page from among the plurality of PDL files which are generated from the first page of the document by the PDL file generation section 23, and transmits the corresponding PDL file to the image processing apparatus 30. In the present exemplary embodiment, the corresponding PDL file for the first page is used as an example of a first PDL file written in a PDL of a specific type, from among the plurality of PDL files, and the function of the print instruction section 27 is used as an example of a first output function to output a print instruction that instructs the printing device to print a first PDL file. Next, the print instruction section 27 transmits a corresponding PDL file for the second and subsequent pages which is generated from the second and subsequent pages of the document by the PDL file generation section 23 to the image processing apparatus 30. In the present exemplary embodiment, the function of the print instruction section 27 is used as an example of a second output function to output a second PDL file to the printing device.

(Operation of Image Processing System)

Figure 5:
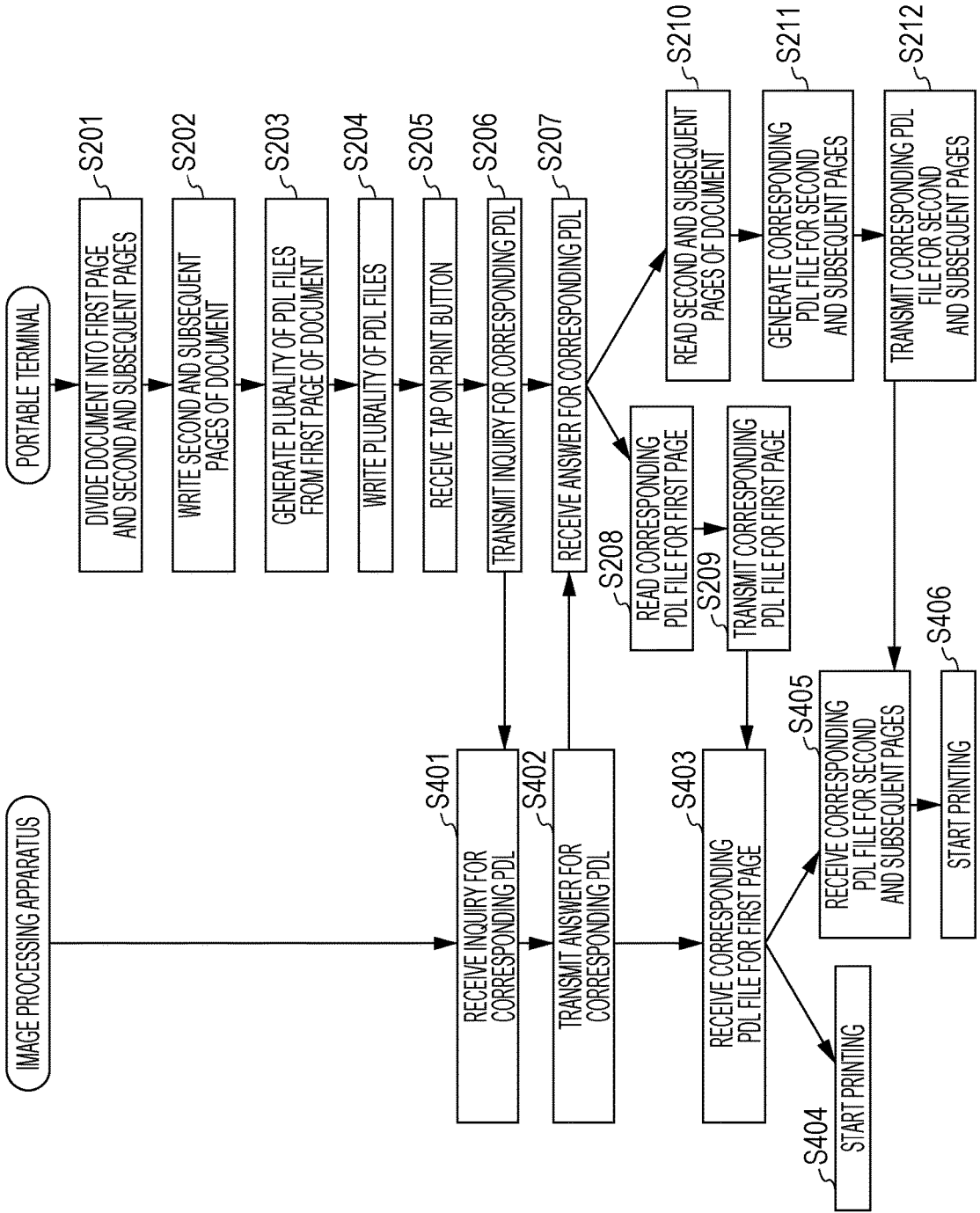
FIG. 5 is a sequence diagram illustrating an operation example of the image processing system according to the first exemplary embodiment of the present disclosure.

FIG. 5 is a sequence diagram illustrating an operation example of the image processing system 1 according to the first exemplary embodiment.

First, the print preparation process will be described. The print preparation process is preferably performed when the user opens a document using an app that implements the present exemplary embodiment on the portable terminal 10, for example.

When the print preparation process is started, the document dividing section 21 of the portable terminal 10 divides a document into a first page and second and subsequent pages (step S201). Then, the document dividing section 21 writes the second and subsequent pages of the document into the document storage section 22 in association with a UUID (step S202).

After that, the PDL file generation section 23 receives the first page of the document, which is obtained by the dividing in step S201, from the document dividing section 21, and generates a plurality of PDL files from the first page of the document (step S203). Then, the PDL file generation section 23 writes the plurality of PDL files into the PDL file storage section 24 in association with a UUID (step S204).

Next, the print instruction process will be described.

When the user taps the print button on the portable terminal 10, the operation receiving section 25 of the portable terminal 10 receives the tap operation (step S205).

Then, the PDL specifying section 26 acquires a corresponding PDL from the image processing apparatus 30 as the output destination. Specifically, first, the PDL specifying section 26 of the portable terminal 10 transmits an inquiry for a corresponding PDL to the image processing apparatus 30 (step S206), and the image processing apparatus 30 receives the inquiry for a corresponding PDL from the portable terminal 10 (step S401). Consequently, the image processing apparatus 30 transmits an answer for the corresponding PDL to the portable terminal 10 (step S402), and the PDL specifying section 26 of the portable terminal 10 receives the answer for the corresponding PDL (step S207). The corresponding PDL is preferably acquired using a management information base (MIB), for example.

After that, the print instruction section 27 reads a PDL file of the corresponding PDL which is specified through the sequence of processes in steps S206, S401, S402, and S207, among the plurality of PDL files which are written into the PDL file storage section 24 in step S204, as a corresponding PDL file for the first page (step S208). Then, the print instruction section 27 transmits the corresponding PDL file for the first page to the image processing apparatus 30 (step S209).

On the other hand, concurrently with step S208, the PDL file generation section 23 reads the second and subsequent pages of the document which are written into the document storage section 22 in step S202 (step S210). Then, the PDL file generation section 23 generates a corresponding PDL file for the second and subsequent pages by converting the second and subsequent pages of the document into the corresponding PDL which is specified through the sequence of processes in steps S206, S401, S402, and S207 (step S211). When generation of a corresponding PDL file for the second and subsequent pages is completed, the print instruction section 27 transmits the corresponding PDL file for the second and subsequent pages to the image processing apparatus 30 if transmission of the PDL file for the first page is completed (step S212).

Next, the print process will be described.

The image processing apparatus 30 receives the corresponding PDL file for the first page from the portable terminal 10 (step S403). Then, the image processing apparatus 30 stands by until all the corresponding PDL file for the first page is received from the portable terminal 10. The image processing apparatus 30 starts printing on the basis of the corresponding PDL file for the first page when all the corresponding PDL file for the first page is received (step S404).

After that, the image processing apparatus 30 receives the corresponding PDL file for the second and subsequent pages (step S405). Then, the image processing apparatus 30 starts printing on the basis of the corresponding PDL file for the second and subsequent pages when all the corresponding PDL file for the second and subsequent pages is received (step S406).

[Second Exemplary Embodiment]

(Overall Configuration of Image Processing System)

Figure 6:
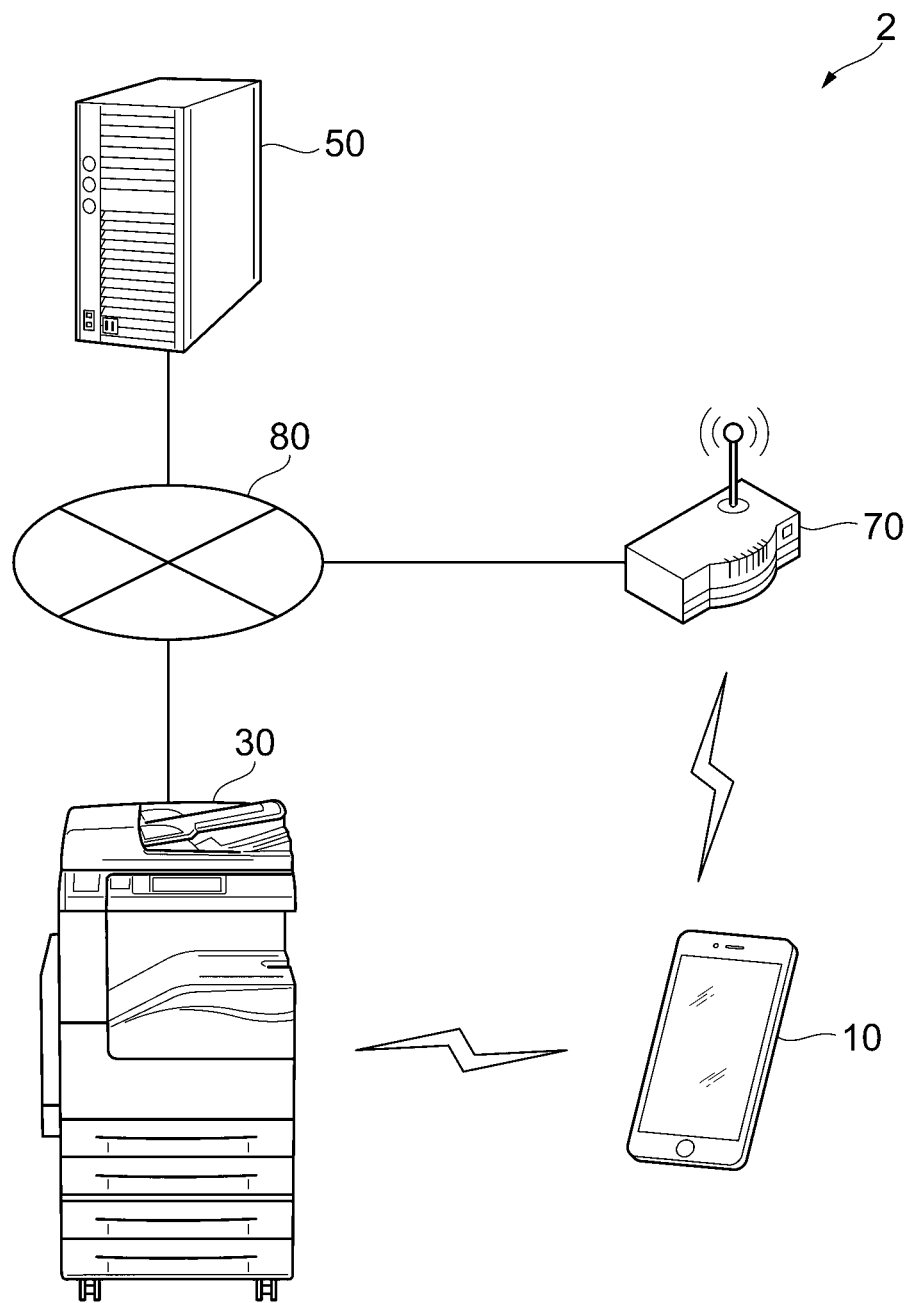
FIG. 6 illustrates an example of the overall configuration of an image processing system according to a second exemplary embodiment of the present disclosure.

FIG. 6 illustrates an example of the overall configuration of an image processing system 2 according to the present exemplary embodiment. As illustrated in the drawing, the image processing system 2 includes a portable terminal 10, an image processing apparatus 30, and a server 50. The portable terminal 10 is wirelessly connectable to a communication line 80 via an access point 70 through wireless communication such as Wi-Fi (registered trademark), and is also wirelessly connectable to the image processing apparatus 30 through near-field wireless communication such as NFC (Near Field Communication) or BLE (Bluetooth Low Energy) (registered trademark). The image processing apparatus 30 and the server 50 are connected to the communication line 80. While there is only one each of portable terminal 10, image processing apparatus 30, and server 50 in the drawing, there may be a plurality of portable terminals 10, image processing apparatuses 30, and servers 50. The communication line 80 may be the Internet, for example.

The portable terminal 10 is a computer device that is used by a user of the image processing apparatus 30. The portable terminal 10 instructs the image processing apparatus 30 to print document data saved in the server 50. The portable terminal 10 is preferably implemented by a smartphone, for example. In the present exemplary embodiment, the portable terminal 10 is provided as an example of a computer and an information processing apparatus.

The image processing apparatus 30 is a device that performs image processing such as forming an image on a recording medium such as paper, reading an image from a recording medium such as paper, transmitting an image to a public line, and receiving an image from a public line. It should be noted, however, that the image processing apparatus 30 may perform at least one of such image processing operations. For example, the image processing apparatus 30 is a printer from the viewpoint of forming an image only, a scanner from the viewpoint of reading an image only, a copier from the viewpoint of reading an image and forming an image, and a facsimile from the viewpoint of reading an image, transmitting an image, receiving an image, and forming an image. In the present exemplary embodiment, the image processing apparatus 30 is provided as an example of a printing device.

The server 50 is a computer device that provides a cloud service for saving document data. The server 50 saves document data to be printed, and additionally saves data prepared when the portable terminal 10 instructs the image processing apparatus 30 to print the document data. In the present exemplary embodiment, the server 50 is provided as an example of an external storage device.

(Hardware Configuration of Portable Terminal)

The hardware configuration of the portable terminal 10 is the same as that illustrated in FIG. 2, and thus is not described.

(Hardware Configuration of Image Processing Apparatus)

The hardware configuration of the image processing apparatus 30 is the same as that illustrated in FIG. 3, and thus is not described.

(Hardware Configuration of Server)

Figure 7:
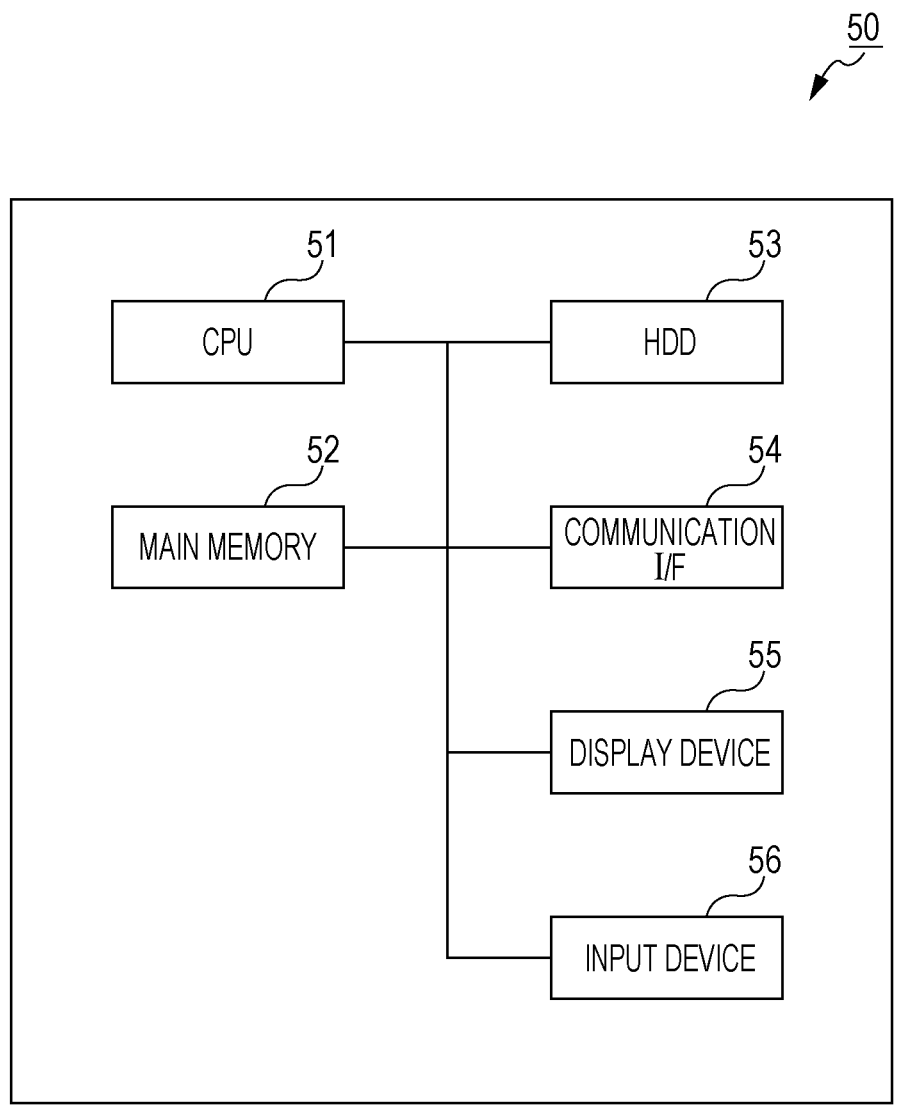
FIG. 7 illustrates an example of the hardware configuration of a server according to the second exemplary embodiment of the present disclosure.

FIG. 7 illustrates an example of the hardware configuration of the server 50 according to the present exemplary embodiment. As illustrated in the drawing, the server 50 includes a CPU 51 that serves as a computation unit, and a main memory 52 and an HDD 53 that each serve as a storage unit. The CPU 51 executes various types of software such as an operating system (OS) and applications, and implements functions to be discussed later. The main memory 52 is a storage region in which the various types of software, data for execution of such software, etc., are stored. The HDD 53 is a storage region in which data input to the various types of software, data output from the various types of software, etc., are stored. The server 50 further includes a communication interface (I/F) 54 for external communication, a display device 55 such as a display, and an input device 56 such as a keyboard and a mouse.

(Functional Configuration of Portable Terminal)

Figure 8:
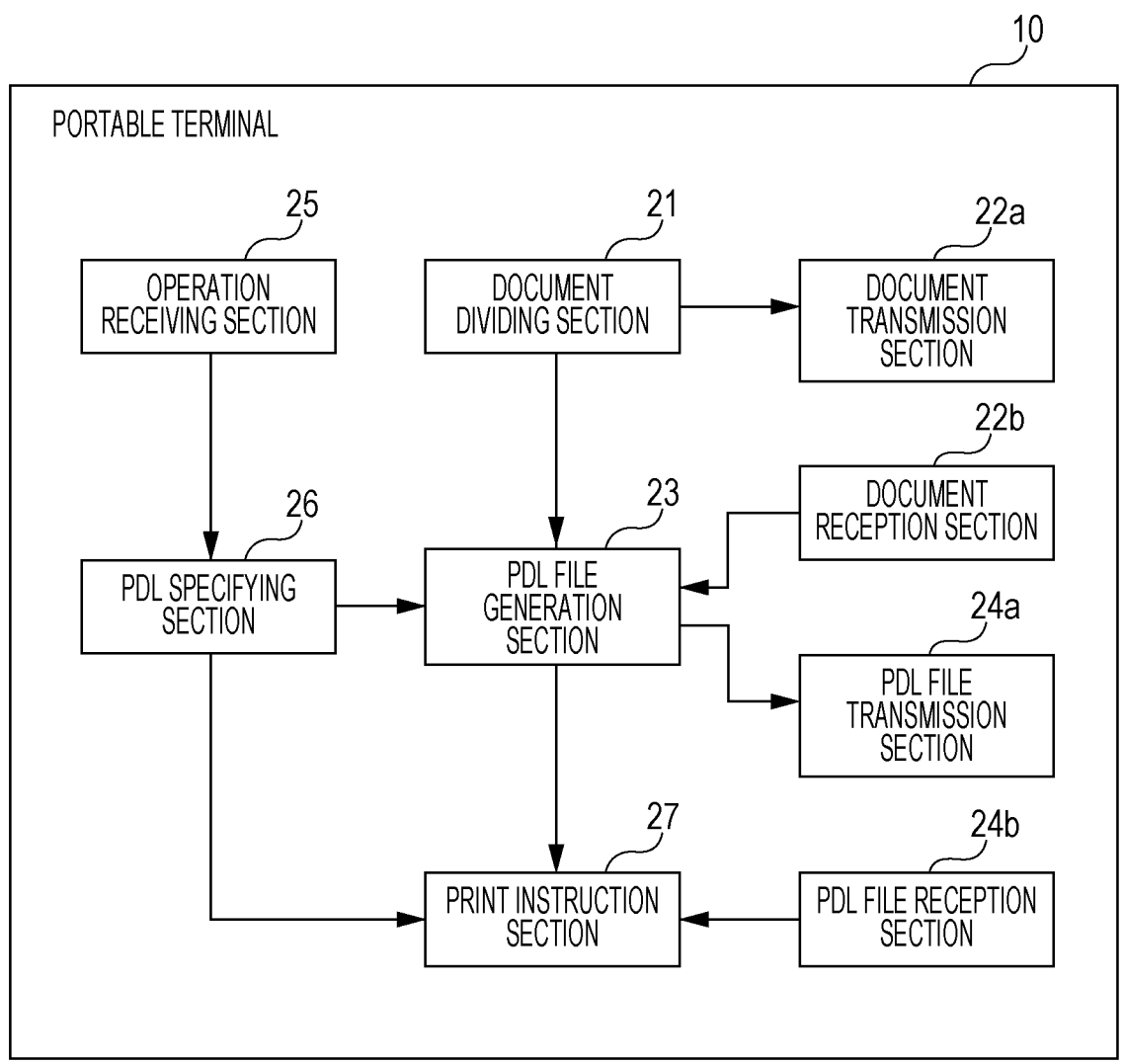
FIG. 8 is a block diagram illustrating an example of the functional configuration of the portable terminal which constitutes the image processing system according to the second exemplary embodiment of the present disclosure.

FIG. 8 is a block diagram illustrating an example of the functional configuration of the portable terminal 10 which constitutes the image processing system 2 according to the second exemplary embodiment. As illustrated in the drawing, the portable terminal 10 according to the second exemplary embodiment includes a document dividing section 21, a document transmission section 22a, a document reception section 22b, a PDL file generation section 23, a PDL file transmission section 24a, a PDL file reception section 24b, an operation receiving section 25, a PDL specifying section 26, and a print instruction section 27. Among these, the document dividing section 21, the PDL file generation section 23, the operation receiving section 25, the PDL specifying section 26, and the print instruction section 27 are the same as those described in relation to the first exemplary embodiment, and thus are not described. Only the document transmission section 22a, the document reception section 22b, the PDL file transmission section 24a, and the PDL file reception section 24b will be described.

The document transmission section 22a transmits the second and subsequent pages of the document, which are obtained by the dividing by the document dividing section 21, to the server 50. In that event, the document transmission section 22a transmits the second and subsequent pages of the document to the server 50 in association with a UUID. The UUID may be the path name and the file name of the document, for example. Alternatively, the document transmission section 22a may further transmit the first page of the document, which is obtained by the dividing by the document dividing section 21, to the server 50 in association with the second and subsequent pages and the UUID.

The document reception section 22b receives the second and subsequent pages of the document, which are obtained by the dividing by the document dividing section 21, from the server 50 and provides such pages to the PDL file generation section 23 when the PDL file generation section 23 generates a PDL file from the second and subsequent pages of the document.

The PDL file transmission section 24a transmits a plurality of PDL files, which are generated from the first page of the document by the PDL file generation section 23, to the server 50. In that event, the PDL file transmission section 24a transmits the plurality of PDL files to the server 50 in association with a UUID. The UUID may be the path name and the file name of the document as the source of the PDL files, for example.

The PDL file reception section 24b receives the PDL files from the server 50 and provides such PDL files to the print instruction section 27 when the print instruction section 27 takes out a PDL file of a corresponding PDL from among the plurality of PDL files which are generated by the PDL file generation section 23.

The document transmission section 22a transmits the second and subsequent pages of the document to the server 50. The PDL file transmission section 24a transmits a plurality of PDL files generated from the first page of the document to the server 50. Such pages and PDL files are associated with each other with a common UUID. In that sense, the document transmission section 22a and the PDL file transmission section 24a are an example of a control unit that performs control such that the plurality of PDL files and a different portion of the data other than the one portion are stored in an external storage device in association with each other, and the function of the document transmission section 22a and the PDL file transmission section 24a is an example of a control function to perform control such that the plurality of PDL files and a different portion of the data other than the one portion are stored in an external storage device in association with each other.

(Operation of Image Processing System)

Figure 9:
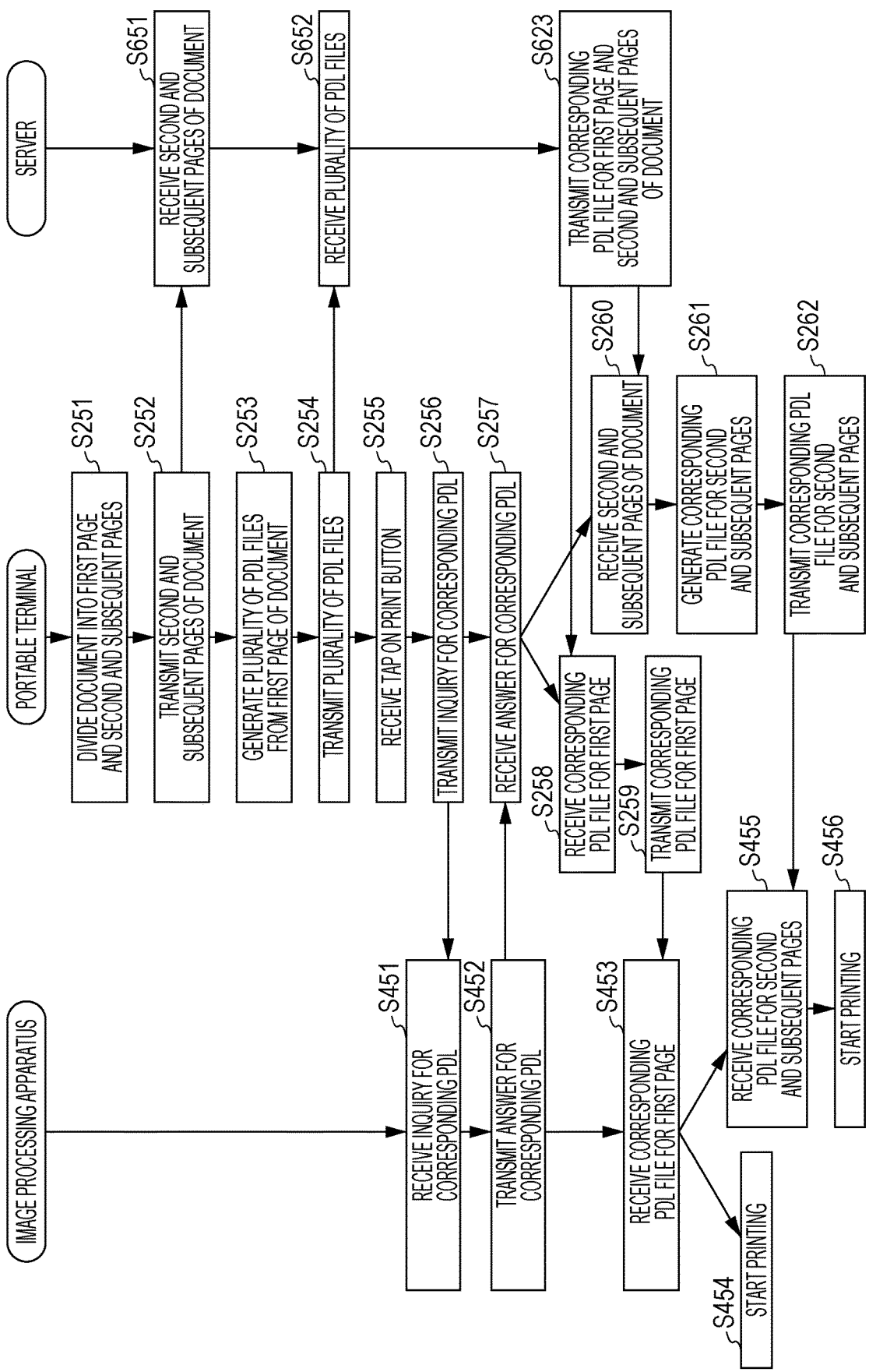
FIG. 9 is a sequence diagram illustrating an operation example of the image processing system according to the first exemplary embodiment of the present disclosure.

FIG. 9 is a sequence diagram illustrating an operation example of the image processing system 2 according to the second exemplary embodiment.

First, the print preparation process will be described. The print preparation process is preferably performed when the user opens a document using an app that implements the present exemplary embodiment on the portable terminal 10, for example.

When the print preparation process is started, the document dividing section 21 of the portable terminal 10 divides a document into a first page and second and subsequent pages (step S251). Then, the document transmission section 22a transmits the second and subsequent pages of the document to the server 50 in association with a UUID (step S252), and the server 50 receives the second and subsequent pages of the document (step S651). The second and subsequent pages of the document which are received are saved in the server 50 in association with a UUID.

After that, the PDL file generation section 23 receives the first page of the document, which is obtained by the dividing in step S251, from the document dividing section 21, and generates a plurality of PDL files from the first page of the document (step S253). Then, the PDL file transmission section 24a transmits the plurality of PDL files to the server 50 in association with a UUID (step S254), and the server 50 receives the plurality of PDL files (step S652). The plurality of PDL files which are received are saved in the server 50 in association with a UUID.

Next, the print instruction process will be described.

When the user taps the print button on the portable terminal 10, the operation receiving section 25 of the portable terminal 10 receives the tap operation (step S255). Then, the PDL specifying section 26 acquires a corresponding PDL from the image processing apparatus 30 as the output destination. Specifically, first, the PDL specifying section 26 of the portable terminal 10 transmits an inquiry for a corresponding PDL to the image processing apparatus 30 (step S256), and the image processing apparatus 30 receives the inquiry for a corresponding PDL from the portable terminal 10 (step S451). Consequently, the image processing apparatus 30 transmits an answer for the corresponding PDL to the portable terminal 10 (step S452), and the PDL specifying section 26 of the portable terminal 10 receives the answer for the corresponding PDL (step S257). The corresponding PDL is preferably acquired using a management information base (MIB), for example.

After that, the PDL file reception section 24b downloads a PDL file of the corresponding PDL which is specified through the sequence of processes in steps S256, S451, S452, and S257, among the plurality of PDL files which are transmitted to the server 50 in step S254, as a corresponding PDL file for the first page. That is, the server 50 transmits the corresponding PDL file for the first page (step S653), and the PDL file reception section 24b receives such a corresponding PDL file (step S258). Then, the print instruction section 27 transmits the corresponding PDL file for the first page to the image processing apparatus 30 (step S259).

On the other hand, concurrently with step S258, the document reception section 22b downloads the second and subsequent pages of the document which are transmitted to the server 50 in step S252. That is, the server 50 transmits the second and subsequent pages of the document (step S653), and the document reception section 22b receives such pages (step S260). Then, the PDL file generation section 23 generates a corresponding PDL file for the second and subsequent pages by converting the second and subsequent pages of the document into the corresponding PDL which is specified through the sequence of processes in steps S256, S451, S452, and S257 (step S261). When generation of a corresponding PDL file for the second and subsequent pages is completed, the print instruction section 27 transmits the corresponding PDL file for the second and subsequent pages to the image processing apparatus 30 if transmission of the PDL file for the first page is completed (step S262).

Next, the print process will be described.

The image processing apparatus 30 receives the corresponding PDL file for the first page from the portable terminal 10 (step S453). Then, the image processing apparatus 30 stands by until all the corresponding PDL file for the first page is received from the portable terminal 10. The image processing apparatus 30 starts printing on the basis of the corresponding PDL file for the first page when all the corresponding PDL file for the first page is received (step S454).

After that, the image processing apparatus 30 receives the corresponding PDL file for the second and subsequent pages (step S455). Then, the image processing apparatus 30 starts printing on the basis of the corresponding PDL file for the second and subsequent pages when all the corresponding PDL file for the second and subsequent pages is received (step S456).

In the above description, the portable terminal 10 downloads the corresponding PDL file for the first page, and transmits such a file to the image processing apparatus 30. However, the present disclosure is not limited thereto. The corresponding PDL file for the first page may be directly downloaded from the server 50 to the image processing apparatus 30. In the former, the print instruction section 27 transmits the corresponding PDL file for the first page to the image processing apparatus 30. In this case, the function of the print instruction section 27 is an example of a first output function to output the first PDL file to the printing device as the print instruction. In the latter, the print instruction section 27 instructs the image processing apparatus 30 or the server 50 such that the corresponding PDL file for the first page is directly transmitted from the server 50 to the image processing apparatus 30. In this case, the function of the print instruction section 27 is an example of a first output function to output an instruction that causes the first PDL file, among the plurality of PDL files which are stored in an external storage device, to be transmitted to the printing device not by way of a computer as the print instruction.

Although not mentioned above, the server 50 may be provided with a rendering function based on the PDL file for the first page. Consequently, the image processing apparatus 30 is provided with a print instruction for the first page with changed print setting even in the case where print setting is changed on the portable terminal 10.

[Modifications]

(First Modification)

In the first and second exemplary embodiments, the PDL file generation section 23 generates one set of a plurality of PDL files that matches one print setting beforehand. In order to support a change in print setting, however, the PDL file generation section 23 may generate a plurality of sets of a plurality of PDL files that match a plurality of print settings beforehand. For example, three sets of a plurality of PDL files that match a case where only double-sided print is set, a case where only print in which two pages are collectively printed on one medium is set, and a case where both double-sided print and print in which two pages are collectively printed on one medium are set may be generated in addition to one set of a plurality of PDL files for a case where neither double-sided print nor print in which two pages are collectively printed on one medium is set according to the first and second exemplary embodiments. In this case, the function of the PDL file generation section 23 is an example of a first generation function to generate a plurality of PDL files for each of a plurality of print settings.

In this first modification, a plurality of patterns that match the plurality of print settings may be prepared also for a portion of the document that is not converted into a PDL beforehand. Alternatively, only one pattern that covers all the patterns, among a plurality of patterns that match a plurality of print settings, may be prepared, and a necessary portion may be cut out from the one pattern to be used when the print setting is determined. In the example discussed above, it is conceivable to prepare four patterns, that is, the second and subsequent pages for a case where neither double-sided print nor print in which two pages are collectively printed on one medium is set, the third and subsequent pages for a case where only double-sided print is set, the fourth and subsequent pages for a case where only print in which two pages are collectively printed on one medium is set, and the fifth and subsequent pages for a case where both double-sided print and print in which two pages are collectively printed on one medium are set. However, only the second and subsequent pages, which cover all the patterns, may be prepared.

(Second Modification)

In the first and second exemplary embodiments, the PDL file generation section 23 converts the first page of a document into a PDL beforehand. However, the page to be converted may be changed in accordance with the print setting. For example, in the case where double-sided print is set, a plurality of PDL files may be generated beforehand for up to the second page of a document. In general, the PDL file generation section 23 preferably generates a plurality of PDL files beforehand for pages to be printed on a first medium in accordance with the print setting. In this case, the function of the PDL file generation section 23 is an example of a first generation function to generate a plurality of PDL files for one portion which is to be printed on a first medium in the case where each print setting is applied.

(Third Modification)

In the first modification, the PDL file generation section 23 generates a plurality of sets of a plurality of PDL files that match a plurality of print settings beforehand. However, print setting may be determined before a plurality of PDL files are generated beforehand. An example of a method of determining the print setting is considered to be a method including saving print setting as a separate file when the user saves a document and determining the print setting on the basis of the separate file. Determining the print setting by this method is an example of specifying the print setting on the basis of information saved in association with data. Another example of the method is considered to be a method including receiving a print setting input from the outside. Consequently, a PDL file that matches a specific print setting is generated when saving a document or when reading a document.

(Fourth Modification)

In the case where print setting may not be determined before a plurality of PDL files are generated beforehand, the PDL file generation section 23 may generate a plurality of PDL files that match default print setting. Examples of the case where print setting may not be determined include a case where print setting is not saved as a separate file and a case where print setting is not input from the outside. In this case, the function of the PDL file generation section 23 is an example of a first generation function to generate a plurality of PDL files for a predetermined print setting in the case where information for specifying the print setting is not saved in association with data.

(Fifth Modification)

In the second to fourth modifications, the PDL file generation section 23 may be considered as specifying one or more print settings before print setting is input in a print request for the image processing apparatus 30, and generating a plurality of PDL files for each of the one or more print settings. In this case, the function of the PDL file generation section 23 is an example of a first generation function to generate a plurality of PDL files for each of one or more print settings specified before print setting is input in a print request for the printing device to print data.

(Sixth Modification)

In the first and second exemplary embodiments, the PDL file generation section 23 generates a plurality of PDL files beforehand for the first page of a document. However, the PDL file generation section 23 may generate a plurality of PDL files beforehand for a portion including the first and subsequent pages of a document. For example, the PDL file generation section 23 may generate a plurality of PDL files for a portion that matches the size of a document, such as generating a plurality of PDL files for the first ten pages in the case where the document contains 100 pages. In this case, the function of the PDL file generation section 23 is an example of a first generation function to generate a plurality of PDL files for one portion that matches the size of the data.

The portion that matches the size of a document may be a portion in a fixed proportion of the entire document such as 1:10, for example. In this case, a portion of a document is an example of a portion with a size that is in a predetermined proportion to the size of the data.

Alternatively, the portion that matches the size of a document may be a portion of the entire document in a variable proportion, for example. The proportion may be varied in accordance with a certain rule. In this case, a portion of a document is an example of a portion with a size that is in a proportion, which is determined in accordance with a predetermined rule, to the size of the data. A method of determining a proportion to the entire document is considered to be a method including determining the proportion on the basis of the speed of printing based on a corresponding PDL file for that portion by the image processing apparatus 30, and a method including determining the proportion on the basis of the speed of generating a corresponding PDL file for a different portion other than that portion. The former is an example of a case where the predetermined rule uses the print speed of the printing device which prints the data, and the latter is an example of a case where the predetermined rule uses the generation speed of generation of a PDL file for the different portion.

(Seventh Modification)

Although not mentioned in relation to the first and second exemplary embodiments, the portable terminal 10 may delete at least part of a plurality of PDL files for the first page of a document in the case where a certain condition is met after such a plurality of PDL files are generated beforehand. In this case, the deleting function is an example of a deleting function to delete at least part of a plurality of PDL files in the case where a predetermined condition is met.

An example of a condition for deleting at least part of a plurality of PDL files is considered to be that the image processing apparatus 30 prints a corresponding PDL file designated from among a plurality of PDL files. In this event, the other PDL files, which are not designated, are not necessary, and are therefore preferably deleted. This is an example of a case where the predetermined condition is that the data have been printed by the printing device.

Another condition for deleting at least part of a plurality of PDL files is considered to be that the image processing apparatus 30 does not use the plurality of PDL files for printing for a predetermined period since such PDL files are saved. In this event, all the plurality of PDL files for a portion of a document are preferably deleted. This is an example of a case where the predetermined condition is that a predetermined time has elapsed since the plurality of PDL files are saved.

[Program]

The process performed by the portable terminal 10 according to the present exemplary embodiment may be prepared as a program such as application software, for example.

That is, a program that implements the present exemplary embodiment causes a computer to execute a process including: generating a plurality of page description language (PDL) files written in a plurality of types of PDLs for one portion of data; and performing control such that the plurality of generated PDL files and a different portion of the data other than the one portion are stored in an internal or external storage device in association with each other.

The programs for implementing the present exemplary embodiment may be not only provided by a communication unit but also provided as stored in a storage medium such as a CD-ROM.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A non-transitory computer readable medium storing a program causing a computer to execute a process, the process comprising:
   generating a plurality of different page description language (PDL) files written in a plurality of different types of PDLs for only one portion of data that is smaller than an entirety of the data;
   performing control such that the plurality of generated PDL files for the only one portion of the data is stored in an internal or external storage device in association with a different portion of the data other than the one portion, for which no PDL file is yet generated;
   upon receiving a user instruction to print, transmitting an inquiry to a printing device regarding a specific PDL type supported by the printing device;
   based on an answer from the printing device, selecting a single one PDL file written in the specific PDL type among the plurality of different PDL files, and transmitting the selected single one PDL file for the one portion of the data to the printing device; and
   after the specific PDL type is specified in the answer from the printing device, generating a new single PDL file written in the specific PDL type for the different portion of the data.

2. The non-transitory computer readable medium according to claim 1, the process further comprising
   outputting a print instruction that instructs the printing device to print the selected single one PDL file for the one portion of the data, and
   outputting the generated new single PDL file for the different portion of the data to the printing device.

3. The non-transitory computer readable medium according to claim 2,
   wherein the outputting the print instruction includes outputting the selected single one PDL file for the one portion of the data to the printing device as the print instruction.

4. The non-transitory computer readable medium according to claim 2,
   wherein the plurality of PDL files for the only one portion of the data is stored in the external storage device in association with the different portion of the data other than the one portion,
   the outputting the print instruction includes outputting an instruction that causes the selected single one PDL file, among the plurality of PDL files, to be transmitted to the printing device not by way of the computer as the print instruction, and
   the generating the new single PDL file includes receiving the different portion of the data which is stored in the external storage device and generating the new single PDL file for the received different portion.

5. The non-transitory computer readable medium according to claim 1,
   wherein the generating the plurality of PDL files includes generating the plurality of PDL files for the one portion of the data which is first to be printed.

6. The non-transitory computer readable medium according to claim 5,
   wherein the data are document data containing a plurality of pages, and
   the one portion is a portion of the document data including a first page.

7. The non-transitory computer readable medium according to claim 1,
   wherein the generating the plurality of PDL files includes generating the plurality of PDL files for each of a plurality of print settings.

8. The non-transitory computer readable medium according to claim 1,
   wherein the generating the plurality of PDL files includes generating the plurality of PDL files for each of one or more print settings specified before a print setting is input by a user in the user instruction to print.

9. The non-transitory computer readable medium according to claim 8,
   wherein the generating the plurality of PDL files includes generating the plurality of PDL files for the one portion which is to be printed on a first medium in a case where each of the one or more print settings is applied.

10. The non-transitory computer readable medium according to claim 8,
    wherein the one or more print settings are specified on a basis of information saved in association with the data.

11. The non-transitory computer readable medium according to claim 8,
    wherein the generating the plurality of PDL files includes generating the plurality of PDL files for a predetermined print setting in a case where information for specifying the one or more print settings is not saved in association with the data.

12. The non-transitory computer readable medium according to claim 1,
    wherein the generating the plurality of PDL files includes generating the plurality of PDL files for the one portion which matches a size of the data.

13. The non-transitory computer readable medium according to claim 12,
    wherein the one portion is a portion with a size that is in a predetermined proportion to the size of the data.

14. The non-transitory computer readable medium according to claim 12,
    wherein the one portion is a portion with a size that is in a proportion, which is determined in accordance with a predetermined rule, to the size of the data.

15. The non-transitory computer readable medium according to claim 14,
    wherein the predetermined rule is a rule that uses a print speed of the printing device which prints the data.

16. The non-transitory computer readable medium according to claim 14,
    wherein the predetermined rule is a rule that uses a generation speed of generation of a PDL file for the different portion.

17. The non-transitory computer readable medium according to claim 1, the process further comprising
    deleting at least part of the plurality of generated PDL files in a case where a predetermined condition is met.

18. The non-transitory computer readable medium according to claim 17,
    wherein the predetermined condition is that the data have been printed by the printing device.

19. The non-transitory computer readable medium according to claim 17,
    wherein the predetermined condition is that a predetermined time has elapsed since the plurality of PDL files are saved.

20. An information processing apparatus comprising:
a processor programmed to act as:
- generate a plurality of different page description language (PDL) files written in a plurality of different types of PDLs for only one portion of data that is smaller than an entirety of the data;
- perform control such that the plurality of generated PDL files for the only one portion of the data is stored in an internal or external storage device in association with a different portion of the data other than the one portion, for which no PDL file is yet generated;
- upon receiving a user instruction to print, transmit an inquiry to a printing device regarding a specific PDL type supported by the printing device;
- based on an answer from the printing device, select a single one PDL file written in the specific PDL type among the plurality of different PDL files, and transmit the selected single one PDL file for the one portion of the data to the printing device; and
- after the specific PDL type is specified in the answer from the printing device, generate a new single PDL file written in the specific PDL type for the different portion of the data.

* * * * *